(12) United States Patent
Yang et al.

(10) Patent No.: US 11,646,450 B2
(45) Date of Patent: May 9, 2023

(54) PROPYLENE CARBONATE-BASED ELECTROLYTE WITH EXTENDED LONG CYCLE LIFE

(71) Applicant: GM GLOBAL TECHNOLOGY OPERATIONS LLC, Detroit, MI (US)

(72) Inventors: Li Yang, Troy, MI (US); Umamaheswari Viswanathan, Troy, MI (US); Mary E. Fortier, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 189 days.

(21) Appl. No.: 17/084,075

(22) Filed: Oct. 29, 2020

(65) Prior Publication Data
US 2022/0140396 A1   May 5, 2022

(51) Int. Cl.
*H01M 10/00* (2006.01)
*H01M 10/0569* (2010.01)
*H01M 10/0567* (2010.01)

(52) U.S. Cl.
CPC ... *H01M 10/0569* (2013.01); *H01M 10/0567* (2013.01); *H01M 2300/0037* (2013.01); *H01M 2300/0051* (2013.01)

(58) Field of Classification Search
CPC ......... H01M 10/0569; H01M 10/0567; H01M 2300/0037; H01M 2300/0051
See application file for complete search history.

(56) References Cited

U.S. PATENT DOCUMENTS

2014/0272604 A1* 9/2014 Lim ................. H01M 10/052
                                                                    429/341
2020/0251769 A1* 8/2020 Ma ................. H01M 10/0525

FOREIGN PATENT DOCUMENTS

| CN | 114430069 A    | 5/2022 |
|----|----------------|--------|
| DE | 102021112634 A1 | 5/2022 |

OTHER PUBLICATIONS

Burns, J. C. et al., "Predicting and Extending the Lifetime of Li-Ion Batteries," Journal of The Electrochemical Society, 160 (9), A1451-A1456; Published Jul. 3, 2013, DOI: 10.1149/2.060309jes.

* cited by examiner

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

An electrolyte is provided. The electrolyte includes a solvent containing propylene carbonate (PC); a lithium salt dissolved in the solvent; a first additive dissolved in the solvent, the first additive being configured to stabilize an anode solid electrolyte interphase; a second additive dissolved in the solvent, the second additive being configured to stabilize at least one of an anode, a cathode, or the lithium salt; and a third additive dissolved in the solvent, the third additive being configured to stabilize at least one of an anode, a cathode, or the lithium salt. The first, second, and third additives are chemically distinct. Electrochemical cells including the electrolyte are also provided.

16 Claims, 2 Drawing Sheets

FIG. 1 propylene carbonate
(PC)

vinylene carbonate
(VC)

lithium difluorophosphate
LiPO$_2$F$_2$
(LFO)

prop-1-ene-1,3-sultone
(PES)

FIG. 2

PROPYLENE CARBONATE-BASED ELECTROLYTE WITH EXTENDED LONG CYCLE LIFE

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. One of the two electrodes serves as a positive electrode or cathode, and the other electrode serves as a negative electrode or anode. Many rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes.

The electrolyte includes a lithium salt in a solvent and is suitable for conducting lithium ions between the electrodes. Therefore, it is beneficial to employ an electrolyte that is stable and does not negatively interact with electrodes, such as by causing exfoliation of graphite anodes or degradation of lithium-based cathodes, especially when including propylene carbonate (PC) in the solvent. Minimizing electrode exfoliation and/or degradation extends the lifetime of the lithium-ion battery.

SUMMARY

This section provides a general summary of the disclosure, and is not a comprehensive disclosure of its full scope or all of its features.

The present disclosure relates to a propylene carbonate (PC)-based electrolyte with an extended long cycle life.

In various aspects, the current technology provides an electrolyte composition having a solvent including propylene carbonate (PC); a lithium salt dissolved in the solvent; a first additive dissolved in the solvent, the first additive being configured to stabilize an anode solid electrolyte interphase; a second additive dissolved in the solvent, the second additive being configured to stabilize at least one of an anode, a cathode, or the lithium salt; and a third additive dissolved in the solvent, the third additive being configured to stabilize at least one of an anode, a cathode, or the lithium salt, wherein the first, second, and third additives are chemically distinct.

In one aspect, the first additive is vinylene carbonate (VC).

In one aspect, the second additive is lithium difluorophosphate (LFO).

In one aspect, the third additive is prop-1-ene-1,3-sultone (PES).

In one aspect, the electrolyte composition includes greater than or equal to about 0.05 wt. % to less than or equal to about 5 wt. % of vinylene carbonate (VC) as the first additive; greater than or equal to about 0.05 wt. % to less than or equal to about 5 wt. % of lithium difluorophosphate (LFO) as the second additive; and greater than or equal to about 0.05 wt. % to less than or equal to about 5 wt. % of prop-1-ene-1,3-sultone (PES) as the third additive.

In one aspect, the solvent further includes a co-solvent selected from the group consisting of cyclic carbonates, acyclic carbonates, aliphatic carboxylic esters, γ-lactones, chain structure ethers, cyclic ethers, and combinations thereof.

In one aspect, the solvent further includes a co-solvent selected from the group consisting of ethylene carbonate (EC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, 1,2-dimethoxyethane, 1-2-diethoxyethane, ethoxymethoxyethane, ethyl propyl ether (EPE), fluorinated linear carbonate (F-EMC), fluorinated ether (F-EPE), tetrahydrofuran (THF), 2-methyltetrahydrofuran (2-Me THF), and combinations thereof.

In one aspect, the solvent includes ethylene carbonate (EC), the propylene carbonate (PC), and ethyl methyl carbonate (EMC).

In one aspect, the solvent includes the ethylene carbonate (EC), the propylene carbonate (PC), and the ethyl methyl carbonate (EMC) at a EC:PC:EMC ratio of about 30:5:65 (w:w:w).

In one aspect, the lithium salt has lithium hexafluorophosphate (LiPF$_6$), lithium bis(fluorosulfonyl)imide (LiFSi), lithium bis(trifluoromethanesulfonyl)imide (LiTFSI), lithium tetrafluoroborate (LiBF$_4$), lithium bis(oxalato) borate (LiBOB), lithium oxalyldifluoroborate (LiODFB), lithium sulfonylbis(fluorosulfonyl)imide (LiSFSI), lithium carbonylbis(fluorosulfonyl)imide (LiCFSI), lithium perchlorate (LiClO$_4$), lithium tetrachloroaluminate (LiAlCl$_4$), lithium iodide (LiI), lithium bromide (LiBr), lithium thiocyanate (LiSCN), lithium tetraphenylborate (LiB(C$_6$H$_5$)$_4$), lithium hexafluoroarsenate (LiAsF$_6$), lithium trifluoromethanesulfonate (LiCF$_3$SO$_3$), lithium bis(trifluoromethanesulfonimide) (LiN(CF$_3$SO$_2$)$_2$), or combinations thereof.

In one aspect, the current technology provides an electrochemical cell including the electrolyte composition.

In various aspects, the current technology also provides an electrolyte composition including a solvent including propylene carbonate (PC); a lithium salt dissolved in the solvent; and a plurality of additives dissolved in the solvent, wherein the plurality of additives includes vinylene carbonate (VC), lithium difluorophosphate (LFO), and prop-1-ene-1,3-sultone (PES).

In one aspect, the electrolyte composition includes greater than or equal to about 5 wt. % to less than or equal to about 70 wt. % of the propylene carbonate (PC); the lithium salt at a concentration of greater than or equal to about 0.25 M to less than or equal to about 2 M; and greater than or equal to about 0.05 wt. % to less than or equal to about 5 wt. % of each of the vinylene carbonate (VC), the lithium difluorophosphate (LFO), and the prop-1-ene-1,3-sultone (PES), individually.

In one aspect, the solvent further includes ethylene carbonate (EC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, 1,2-dimethoxyethane, 1-2-diethoxyethane, ethoxymethoxyethane, ethyl propyl ether (EPE), fluorinated linear carbonate (F-EMC), fluorinated ether (F-EPE), tetrahydrofuran (THF), 2-methyltetrahydrofuran (2-Me THF), or combinations thereof, and the lithium salt includes lithium hexafluorophosphate (LiPF$_6$), lithium bis(fluorosulfonyl)

imide) (LiFSi), lithium bis(trifluoromethanesulfonyl)imide (LiTFSI), lithium tetrafluoroborate ($LiBF_4$), lithium bis(oxalato) borate (LiBOB), lithium oxalyldifluoroborate (LiODFB), lithium sulfonylbis(fluorosulfonyl)imide (LiSFSI), lithium carbonylbis(fluorosulfonyl)imide (LiCFSI), lithium perchlorate ($LiClO_4$), lithium tetrachloroaluminate ($LiAlCl_4$), lithium iodide (LiI), lithium bromide (LiBr), lithium thiocyanate (LiSCN), lithium tetraphenylborate ($LiB(C_6H_5)_4$), lithium hexafluoroarsenate ($LiAsF_6$), lithium trifluoromethanesulfonate ($LiCF_3SO_3$), lithium bis(trifluoromethanesulfonimide) ($LiN(CF_3SO_2)_2$), or combinations thereof.

In various aspects, the current technology yet further provides an electrochemical cell including a separator disposed between an anode and a cathode and an electrolyte disposed in the separator and bridging the anode and the cathode, wherein the electrolyte includes a solvent including propylene carbonate (PC); a lithium salt dissolved in the solvent; and a plurality of additives dissolved in the solvent, wherein the plurality of additives including vinylene carbonate (VC), lithium difluorophosphate (LFO), and prop-1-ene-1,3-sultone (PES).

In one aspect, the solvent of the electrolyte further includes ethylene carbonate (EC), ethyl methyl carbonate (EMC), dimethyl carbonate (DMC), diethyl carbonate (DEC), or combinations thereof.

In one aspect, the lithium salt includes lithium hexafluorophosphate ($LiPF_6$).

In one aspect, the anode includes graphite, wherein the graphite is substantially free of exfoliation after 800 cycles of charging and discharging.

In one aspect, the electrochemical cell exhibits a capacity retention of greater than or equal to about 95% after 800 cycles of charging and discharging.

In one aspect, the electrochemical cell exhibits a capacity retention of greater than or equal to about 98% after 800 cycles of charging and discharging.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including exemplary values, endpoints, and sub-ranges given for the ranges.

Example embodiments will now be described more fully with reference to the accompanying drawings.

Electrolytes, including a lithium salt in a solvent, provide a medium for lithium ions to traverse between an anode and cathode during charging and discharging cycles of a lithium-ion battery, i.e., an electrochemical cell that cycles lithium ions. It is beneficial to employ stable electrolytes in order to extend the cycle efficiency and lifetime of lithium-ion batteries. Accordingly, the current technology provides an electrolyte for a lithium-ion battery that includes propylene carbonate (PC) in a solvent and at least three additives. The electrolyte is stabilizing in that graphite anodes and/or lithium-based cathodes do not become exfoliated or degraded when included in a lithium-ion battery including the electrolyte. As such, the lithium-ion battery has an extended capacity retention and lifetime relative to a corresponding lithium-ion battery that includes identical components, but does not include all three additives in the electrolyte.

Figure 1:
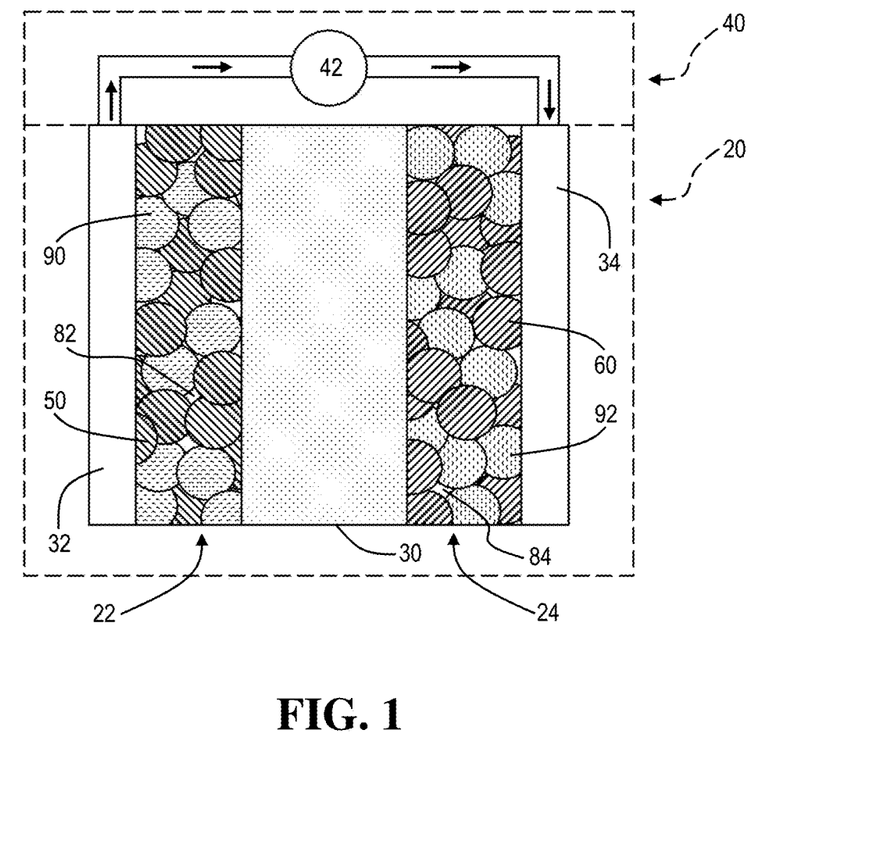
FIG. 1 is a graphic illustration of an electrochemical cell in accordance with various aspects of the current technology.

A schematic illustration of an exemplary electrochemical cell 20 (also referred to herein as "the battery"), i.e., a lithium-ion cell, that cycles lithium ions is shown in FIG. 1. Unless specifically indicated otherwise, the term "ions" as used herein refers to lithium ions. The battery 20 includes a negative electrode 22, a positive electrode 24, and a separator 30 (e.g., a microporous polymeric separator) disposed between the electrodes 22, 24. An electrolyte (i.e., a liquid electrolyte) is present throughout the separator 30 and optionally present in the negative electrode 22 as a solid anolyte 90 and/or the positive electrode 24 as a solid catholyte 92. Optionally, a first plurality of electrolyte particles or a second liquid electrolyte (i.e., an anolyte) 90 and/or a second plurality of electrolyte particles or a third liquid electrolyte (i.e., a catholyte) 92 may also be mixed with negative electroactive particles 50 and positive electroactive particles 60 present in the negative electrode 22 and the positive electrode 24, respectively, to form a continuous electrolyte network, which may be a continuous solid-liquid hybrid electrolyte network. For example, the negative electroactive particles 50 and the positive electroactive particles 60 are independently mixed with no electrolyte, with the first/second plurality of electrolyte particles 90, 92, or with the second/third liquid electrolyte 90, 92.

A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). Composite electrodes can also include an electrically conductive diluent, such as carbon black or carbon nanotubes, which is dispersed throughout the materials that define the negative electrode 22 and/or the positive electrode 24.

The battery 20 can generate an electric current (indicated by the block arrows) during discharge by way of reversible electrochemical reactions that occur when the external circuit 40 is closed (to connect the negative electrode 22 and the positive electrode 24) and when the negative electrode 22 contains a relatively greater quantity of lithium. The chemical potential difference between the negative electrode 22 and the positive electrode 24 drives electrons produced by the oxidation of inserted lithium at the negative electrode 22 through the external circuit 40 towards the positive electrode 24. Ions, which are also produced at the negative electrode 22, are concurrently transferred through the separator 30 towards the positive electrode 24. The electrons flow through the external circuit 40, and the ions migrate across the separator 30 via the electrolyte to the positive electrode 24, where they may be plated, reacted, or intercalated. The electric current passing through the external circuit 40 can be harnessed and directed through the load device 42 (in the direction of the block arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The connection of the external power source to the battery 20 compels the non-spontaneous oxidation of one or more metal elements at the positive electrode 24 to produce electrons and ions. The electrons, which flow back towards the negative electrode 22 through the external circuit 40, and the ions, which move across separator 30 back towards the negative electrode 22, reunite at the negative electrode 22 and replenish it with lithium for consumption during the next battery discharge cycle. As such, each discharge and charge event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators. In many of the configurations of the battery 20, each of the negative electrode current collector 32, the negative electrode 22, the separator 30, the positive electrode 24, and the positive electrode current collector 34 are prepared as relatively thin layers (for example, from several microns to a millimeter or less in thickness) and assembled in layers connected in electrical parallel arrangement to provide a suitable electrical energy and power package. In various other instances, the battery 20 may include electrodes 22, 24 that are connected in series.

Further, in certain aspects, the battery 20 may include a variety of other components that, while not depicted here, are nonetheless known to those of skill in the art. For instance, the battery 20 may include a casing, a gasket, terminal caps, and any other conventional components or materials that may be situated within the battery 20, including between or around the negative electrode 22, the positive electrode 24, and/or the separator 30, by way of non-limiting example. As noted above, the size and shape of the battery 20 may vary depending on the particular applications for which it is designed. Battery-powered vehicles and handheld consumer electronic devices are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate an electric current to the load device 42 that can be operatively connected to the external circuit 40. The load device 42 may be powered fully or partially by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy.

The separator 30 is disposed between the negative electrode 22 and the positive electrode 24. The separator 30 operates as an electrical insulator by being sandwiched between the negative electrode 22 and the positive electrode 24 to prevent physical contact and the occurrence of a short circuit. The liquid electrolyte solution is present throughout the separator 30 and, optionally, in the negative electrode 22 as the anolyte 90 and/or in the positive electrode 24 as the catholyte 92. Therefore, in addition to providing a physical barrier between the electrodes 22, 24, the separator 30 acts like a sponge that contains the electrolyte solution in a network of open pores during the cycling of lithium ions to facilitate functioning of the battery 20. As discussed above, the chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode 22, are concurrently transferred through the liquid electrolyte solution contained in the separator 30 towards the positive electrode 24. The electrons flow through the external circuit 40 and the lithium ions migrate across the separator 30 containing the electrolyte solution to form intercalated lithium at the positive electrode 24.

The separator 30 operates as both an electrical insulator and a mechanical support. In some aspects, the separator 30 comprises a polyolefin, which may be microporous. The polyolefin may be a homopolymer (derived from a single monomer constituent) or a heteropolymer (derived from more than one monomer constituent), which may be either linear or branched. When a heteropolymer, the polyolefin may be derived from two monomer constituents. The polyolefin may assume any copolymer chain arrangement, including that of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP).

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, multiple discrete layers of similar or dissimilar polyolefins may be assembled to form the microporous polymer separator 30. The polyolefins may be homopolymers (derived from a single monomer constituent) or heteropolymers (derived from more than one monomer constituent), which may be either linear or branched. If a heteropolymer is derived from two monomer constituents, the polyolefin may assume any copolymer chain arrangement, including that of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), a blend of polyethylene (PE) and polypropylene (PP), or multi-layered structured porous films of polyethylene (PE) and/or polypropylene (PP). The microporous polymer separator 30 may also comprise other polymers in addition to the polyolefin, such as, but not limited to, polyethylene terephthalate (PET), polyvinylidene fluoride (PVDF), and/or a polyamide. Commercially available polyolefin porous membranes include CELGARD® 2500 (a monolayer polypropylene separator) and CELGARD® 2320 (a trilayer polypropylene/polyethylene/polypropylene separator), both available from Celgard, LLC. The polyolefin layer and any other optional polymer layers may further be included in the microporous polymer separator 30 as a fibrous layer to help provide the microporous polymer separator 30 with appropriate structural and porosity characteristics. Various conventionally available polymers and commercial products for forming the separator 30 and the many manufacturing methods that may be employed to produce such microporous polymer separators 30 are contemplated.

When a polymer, the separator 30 may be mixed with a ceramic material or its surface may be coated in a ceramic material. For example, a ceramic coating may include ceramic oxides such as alumina ($Al_2O_3$), silicon dioxide ($SiO_2$), titania ($TiO_2$), lithium lanthanum zirconium oxide (LLZO), lithium lanthanum titanium oxide (LLTO), lithium aluminum titanium phosphate (LATP), a lithium super ionic conductor (LISICON), lithium phosphorus oxynitride (LIPON), or combinations thereof. In various alternative embodiments, instead of a polymeric material as discussed above, the separator 30 comprises a green ceramic oxide (i.e., a ceramic oxide that has not been sintered or otherwise densified) having a high porosity of greater than or equal to about 10 vol. % to less than or equal to about 50 vol. %.

The negative electrode 22 may be formed from a lithium host material that is capable of functioning as a negative terminal of a lithium-ion battery. For example, in certain variations, the negative electrode 22 may be defined by a plurality of negative electroactive particles 50. In certain instances, as illustrated, the negative electrode 22 is a composite comprising a mixture of the negative electroactive particles 50 and the anolyte 90. For example, the negative electrode 22 may include greater than or equal to about 10 wt. % to less than or equal to about 95 wt. %, and in certain aspects, optionally greater than or equal to about 50 wt. % to less than or equal to about 90 wt. %, of the negative electroactive particles 50 and greater than or equal to about 5 wt. % to less than or equal to about 90 wt. %, and in certain aspects, optionally greater than or equal to about 10 wt. % to less than or equal to about 40 wt. %, of the anolyte 90. Such negative electrodes 22 may have an interparticle porosity 82 between the negative electroactive particles 50 and/or the anolyte 90 (when in the form of solid state anolyte particles) that is greater than or equal to about 0 vol. % to less than or equal to about 20 vol. %. The anolyte 90 may be the same as or different from the catholyte 92.

In certain variations, the negative electroactive particles 50 may be lithium based, comprising, for example, a lithium alloy. In other variations, the negative electroactive particles 50 may be silicon based, comprising, for example, silicon, silica, or a silicon alloy. In still other variations, the negative electrode 22 may be a carbonaceous anode and the negative electroactive particles 50 may comprise one or more negative electroactive materials, such as graphite, graphene, and carbon nanotubes (CNTs). In still further variations, the negative electrode 22 may comprise one or more negative electroactive materials, such as lithium titanium oxide ($Li_4Ti_5O_{12}$); one or more metal oxides, such as vanadium pentoxide ($V_2O_5$); and metal sulfides, such as ferrous sulfide (FeS).

In certain variations, the negative electroactive particles 50 may be optionally intermingled with one or more electrically conductive materials that provide an electron conduction path and/or at least one polymeric binder material that improves the structural integrity of the negative electrode 22. For example, the negative electroactive particles 50 may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), carboxymethyl cellulose (CMC), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like. In certain variations, conductive additives may include, for example, one or more non-carbon conductive additives selected from simple oxides (such as $RuO_2$, $SnO_2$, ZnO, $Ge_2O_3$), superconductive oxides (such as $YBa_2Cu_3O_7$, $La_{0.75}Ca_{0.25}MnO_3$), carbides (such as $SiC_2$), silicides (such as $MoSi_2$), and sulfides (such as $CoS_2$).

In certain aspects, such as when the negative electrode 22 (i.e., anode) does not include lithium metal, mixtures of the conductive materials may be used. For example, the negative electrode 22 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive additives and greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders. The negative electrode current collector 32 may be formed from copper or any other appropriate electrically conductive material known to those of skill in the art.

The positive electrode 24 may be formed from a lithium-based electroactive material that can undergo lithium intercalation and deintercalation while functioning as the positive terminal of the battery 20. For example, in certain variations, the positive electrode 24 may be defined by a plurality of positive electroactive particles 60. In certain instances, as illustrated, the positive electrode 24 is a composite comprising a mixture of the positive electroactive particles 60 and the catholyte 92. For example, the positive electrode 24 may include greater than or equal to about 10 wt. % to less than or equal to about 95 wt. %, and in certain aspects, optionally greater than or equal to about 50 wt. % to less than or equal to about 90 wt. %, of the positive electroactive particles 60 and greater than or equal to about 5 wt. % to less than or equal to about 70 wt. %, and in certain aspects, optionally greater than or equal to about 10 wt. % to less than or equal to about 30 wt. %, of the catholyte 92. Such positive electrodes 24 may have an interparticle porosity 84 between the positive electroactive particles 60 and/or the catholyte 92 (when in the form of solid state catholyte particles) that is greater than or equal to about 1 vol. % to less than or equal to about 20 vol. % and optionally greater than or equal to about 5 vol. % to less than or equal to about 10 vol. %. In various aspects, the positive electrode 24 may be one of a layered-oxide cathode, a spinel cathode, and a polyanion cathode. For example, in the instances of a layered-oxide cathode (e.g., rock salt layered oxides), the positive electroactive particles 60 may comprise one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), and $Li_{1+x}MO_2$ (where $0 \leq x \leq 1$). The spinel cathode may include one or more positive electroactive materials, such as $LiMn_2O_4$ and $LiNi_xMn_{1.5}O_4$. The polyanion cation may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$, and/or a silicate such as $LiFeSiO_4$. In this fashion, in various aspects, the positive electroactive particles 60 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In certain aspects, the positive electroactive particles 60 may be coated (for example, by $Al_2O_3$) and/or the positive electroactive material may be doped (for example, by magnesium).

In certain variations, the positive electroactive particles 60 may be optionally intermingled with one or more electrically conductive materials that provide an electron conduction path and/or at least one polymeric binder material that improves the structural integrity of the positive electrode 24. For example, the positive electroactive particles 60 may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), and/or lithium polyacrylate (LiPAA) binders. Electrically conductive materials may include, for example, carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like.

In certain aspects, mixtures of the conductive materials may be used. For example, the positive electrode 24 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive additives and greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders. The positive electrode current collector 34 may be formed from aluminum or any other electrically conductive material known to those of skill in the art.

As a result of the interparticle porosity 82, 84 between particles within the battery 20, direct contact between the electroactive particles 50, 60 and the anolyte 90 and catholyte 92 when in solid form may be much lower than the contact between the anolyte and the catholyte when in liquid form. To improve contact between the electroactive particles 50, 60 and the solid anolyte 90 and catholyte 92, the amount of the electroactive particles 50, 60 may be increased within the electrodes.

The electrolyte is capable of conducting lithium ions between the negative electrode 22 and the positive electrode 24. In accordance with the current technology, the electrolyte is a liquid composition comprising a solvent, a lithium salt dissolved in the solvent, and at least three additives dissolved in the solvent. The solvent is organic and includes, as non-limiting examples, alkyl carbonates, such as cyclic carbonates (propylene carbonate (PC), ethylene carbonate (EC), butylene carbonate (BC), fluorinated cyclic carbonate (fluoroethylene carbonate (FEC)), acyclic carbonates (dimethyl carbonate (DMC), diethyl carbonate (DEC), ethyl methyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, ethyl propyl ether (EPE), fluorinated linear carbonate (F-EMC), fluorinated ether (F-EPE)), cyclic ethers (tetrahydrofuran (THF), 2-methyltetrahydrofuran (2-Me THF)), or combinations thereof. As such, the solvent can include a plurality of co-solvents.

The electrolyte has a number of particular benefits when the solvent includes propylene carbonate (PC), especially when the negative electrode 22 comprises graphite. Therefore, in some aspects, the solvent includes propylene carbonate (PC) (see FIG. 2) and at least one additional co-solvent. The propylene carbonate (PC) is included in the electrolyte at a concentration of greater than or equal to about 5 wt. % to less than or equal to about 80 wt. %, including at concentrations of about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, or about 80 wt. %. The at least one additional co-solvent is ethylene carbonate (EC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, 1,2-dimethoxyethane, 1-2-diethoxyethane, ethoxymethoxyethane, ethyl propyl ether (EPE), fluorinated linear carbonate (F-EMC), fluorinated ether (F-EPE), tetrahydrofuran (THF), 2-methyltetrahydrofuran (2-Me THF), or combinations thereof, as non-limiting examples. In an exemplary electrolyte, the solvent includes the propylene carbonate (PC) and at least one of ethylene carbonate (EC), ethyl methyl carbonate (EMC), dimethyl carbonate (DMC), or diethyl carbonate (DEC). In another exemplary electrolyte, the solvent includes ethylene carbonate (EC), the propylene carbonate (PC), and ethyl methyl carbonate (EMC), wherein the ethylene carbonate (EC), the propylene carbonate (PC), and the ethyl methyl carbonate (EMC) may be included at a EC:PC:EMC ratio of about 30:5:65 (w:w:w). In some aspects the electrolyte is substantially free of aqueous solvents. By "substantially free of aqueous solvents," it is meant that aqueous solvents can only be included in electrolyte as unavoidable impurities, such as at concentration of less than or equal to about 5 wt. % of the electrolyte.

As non-limiting examples, the lithium salt is lithium hexafluorophosphate (LiPF$_6$), lithium bis(fluorosulfonyl) imide) (LiFSi), lithium bis(trifluoromethanesulfonyl)imide (LiTFSI), lithium tetrafluoroborate (LiBF$_4$), lithium bis(oxalato) borate (LiBOB), lithium oxalyldifluoroborate (LiODFB), lithium sulfonylbis(fluorosulfonyl) imide(LiSFSI), lithium carbonylbis(fluorosulfonyl)imide (LiCFSI), lithium perchlorate (LiClO$_4$), lithium tetrachloroaluminate (LiAlCl$_4$), lithium iodide (LiI), lithium bromide (LiBr), lithium thiocyanate (LiSCN), lithium tetraphenylborate (LiB (C$_6$H$_5$)$_4$), lithium hexafluoroarsenate (LiAsF$_6$), lithium trifluoromethanesulfonate (LiCF$_3$SO$_3$), lithium bis(trifluoromethanesulfonimide) (LiN(CF$_3$SO$_2$)$_2$), or combinations thereof. The lithium salt is provided in the electrolyte, i.e., in the solvent, at a concentration of greater than or equal to about 0.25 M to less than or equal to about 2 M, including at concentrations of about 0.25M, about 0.5 M, about 0.75 M, about 1 M, about 1.25 M, about 1.5 M, about 1.75 M, or about 2 M. When more than one lithium salt is included in the electrolyte, each lithium salt is individually included at the concentration of greater than or equal to about 0.25 M to less than or equal to about 2 M.

Figure 2:
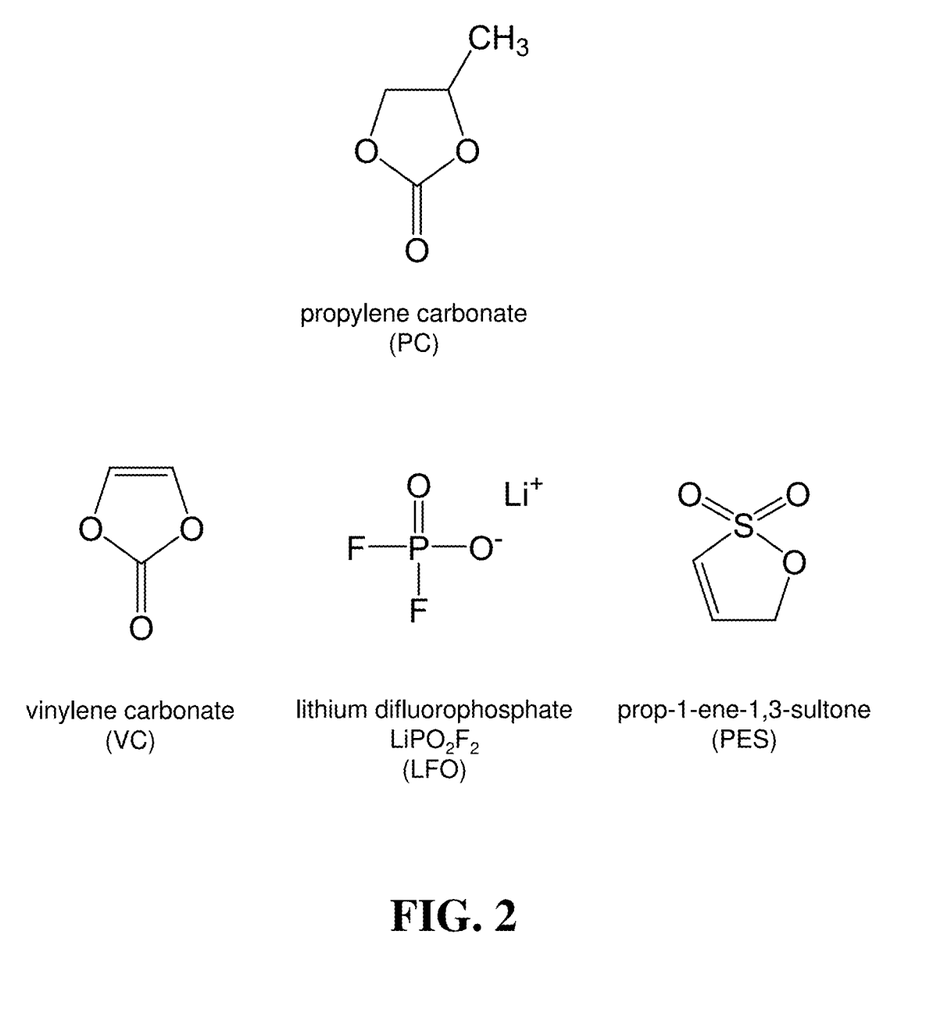
FIG. 2 shows the molecular structures of propylene carbonate (PC), vinylene carbonate (VC), lithium difluorophosphate (LFO), and prop-1-ene-1,3-sultone (PES).

The at least three additives include a first additive dissolved in the solvent, the first additive being configured to stabilize an anode solid electrolyte interphase; a second additive dissolved in the solvent, the second additive being configured to stabilize an anode, a cathode, and the lithium salt; and a third additive dissolved in the solvent, the third additive being configured to stabilize an anode, a cathode, and the lithium salt. The first, second, and third additives are chemically distinct (i.e., none of the additives have the same chemical structure) and are included in the electrolyte individually and independently in concentrations of greater than or equal to about 0.05 wt. % to less than or equal to about 5 wt. %, including at individual and independent concentrations of about 0.05 wt. %, about 0.1 wt. %, about 0.25 wt. %, about 0.5 wt. %, about 0.75 wt. %, about 1 wt. %, about 1.25 wt. %, about 1.5 wt. %, about 1.75 wt. %, about 2 wt. %, about 2.25 wt. %, about 2.5 wt. %, about 2.75 wt. %, about 3 wt. %, about 3.25 wt. %, about 3.5 wt. %, about 3.75 wt. %, about 4 wt. %, about 4.25 wt. %, about 4.5 wt. %, about 4.75 wt. %, or about 5 wt. %. In some aspects, the first additive is vinylene carbonate (VC), the second additive is lithium difluorophosphate (LFO) (LiPO$_2$F$_2$), and the third additive is prop-1-ene-1,3-sultone (PES). Molecular structures of vinylene carbonate (VC), lithium difluorophosphate (LFO), and prop-1-ene-1,3-sultone (PES) are shown in FIG. 2.

In certain aspects, the electrolyte includes propylene carbonate (PC) as a solvent component and vinylene carbonate (VC), lithium difluorophosphate (LFO), and prop-1-ene-1,3-sultone (PES) as the additives. Although additional additives can be included in the electrolyte, it is understood that the additives may be limited to vinylene carbonate (VC), lithium difluorophosphate (LFO), and prop-1-ene-1, 3-sultone (PES). Therefore, the additives can comprise, consist essentially of, or consist of vinylene carbonate (VC), lithium difluorophosphate (LFO), and prop-1-ene-1,3-sultone (PES), where "consists essentially of" means that although no other additive is intentionally included in the electrolyte, unavoidable impurities may be included, for example, at concentrations of less than or equal to about 10 wt. % relative to the total weight of the three additives.

In certain other aspects, the electrolyte comprises, consists essentially of, or consists of the solvent, the lithium salt, and the vinylene carbonate (VC), lithium difluorophosphate (LFO), and prop-1-ene-1,3-sultone (PES), wherein the solvent includes propylene carbonate (PC) and at least one co-solvent described above. As used herein, "consists essentially of" means that although no other component is intentionally included in the electrolyte, unavoidable impurities may be included, for example, at concentrations of less than or equal to about 10 wt. % relative to the total weight of the electrolyte. As a non-limiting example, the solvent comprises, consists essentially of (i.e., only additionally includes unavoidable impurities), or consists of ethylene carbonate (EC), the propylene carbonate (PC), and ethyl methyl carbonate (EMC) at a EC:PC:EMC ratio of about 30:5:65 (w:w:w), the lithium salt at a concentration of 1M, and each of the vinylene carbonate (VC), lithium difluorophosphate (LFO), and prop-1-ene-1,3-sultone (PES) at 2 wt. %. The lithium salt can include at least hexafluorophosphate (LiPF$_6$), as a non-limiting example.

With renewed reference to FIG. 1, when the battery 20 includes negative electroactive particles 50 comprising, consisting essentially of, or consisting of graphite in the negative electrode 22 and the electrolyte includes the at least three additives and optionally propylene carbonate (PC) as a solvent component, the graphite is free or substantially free of exfoliation after 500 cycles, after 600 cycles, after 700 cycles, after 800 cycles, after 900 cycles, or after 1000 cycles of charging and discharging. Similarly, the positive electroactive particles 60 of the positive electrode 24 are free or substantially free of degradation over the same number of charging and discharging cycles. By "substantially free," it is meant that if any exfoliation of the negative electrode 22 and/or degradation of the positive electrode 24 occurs, it does not have a substantial effect on the capacity retention, coulombic efficiency, or lifetime of the electrochemical cell after 500 cycles, after 600 cycles, after 700 cycles, after 800 cycles, after 900 cycles, or after 1000 cycles of charging and discharging, wherein a "substantial effect" is a decrease in any one of the capacity retention, coulombic efficiency, or lifetime of greater than or equal to about 5%. As such, the battery 20 exhibits a capacity retention of greater than or equal to about 95%, greater than or equal to about 98%, or greater than or equal to about 99% after 500 cycles, after 600 cycles, after 700 cycles, after 800 cycles, after 900 cycles, or after 1000 cycles of charging and discharging. The battery 20 additionally exhibits a coulombic efficiency of greater than or equal to about 95%, greater than or equal to about 98%, or greater than or equal to about 99% after 500 cycles, after 600 cycles, after 700 cycles, after 800 cycles, after 900 cycles, or after 1000 cycles of charging and discharging. Accordingly, the battery 20 has a superior capacity retention and coulombic efficiency relative to a corresponding battery that includes identical components, but which does not include all three additives in the electrolyte. Therefore, the battery additionally has a longer lifetime relative to the corresponding battery which includes identical components, but does not include all three additives in the electrolyte.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrolyte composition consisting of:
a solvent comprising ethylene carbonate (EC), propylene carbonate (PC), and ethyl methyl carbonate (EMC) at a EC:PC:EMC weight ratio of about 30:5:65;
a lithium salt dissolved in the solvent;
a first additive dissolved in the solvent, the first additive being configured to stabilize an anode solid electrolyte interphase, wherein the first additive is vinylene carbonate (VC);
a second additive dissolved in the solvent, the second additive being configured to stabilize at least one of an anode, a cathode, or the lithium salt, wherein the second additive is lithium difluorophosphate (LFO); and
a third additive dissolved in the solvent, the third additive being configured to stabilize at least one of an anode, a cathode, or the lithium salt, wherein the third additive is prop-1-ene-1,3-sultone (PES),
wherein the first, second, and third additives are chemically distinct.

2. The electrolyte composition according to claim 1, comprising:
greater than or equal to about 0.05 wt. % to less than or equal to about 5 wt. % of vinylene carbonate (VC) as the first additive;
greater than or equal to about 0.05 wt. % to less than or equal to about 5 wt. % of lithium difluorophosphate (LFO) as the second additive; and
greater than or equal to about 0.05 wt. % to less than or equal to about 5 wt. % of prop-1-ene-1,3-sultone (PES) as the third additive.

3. The electrolyte composition according to claim 1, wherein the solvent further comprises a co-solvent selected from the group consisting of cyclic carbonates, acyclic carbonates, aliphatic carboxylic esters, y-lactones, chain structure ethers, cyclic ethers, and combinations thereof.

4. The electrolyte composition according to claim 1, wherein the solvent further comprises a co-solvent selected from the group consisting of butylene carbonate (BC), fluoroethylene carbonate (FEC), dimethyl carbonate (DMC), diethyl carbonate (DEC), methyl formate, methyl acetate, methyl propionate, γ-butyrolactone, γ-valerolactone, 1,2-dimethoxyethane, 1-2-diethoxyethane, ethoxymethoxyethane, ethyl propyl ether (EPE), fluorinated linear carbonate (F-EMC), fluorinated ether (F-EPE), tetrahydrofuran (THF), 2-methyltetrahydrofuran (2-Me THF), and combinations thereof.

5. The electrolyte composition according to claim 1, wherein the lithium salt comprises lithium hexafluorophosphate (LiPF$_6$), lithium bis(fluorosulfonyl)imide) (LiFSi), lithium bis(trifluoromethanesulfonyl)imide (LiTFSI), lithium tetrafluoroborate (LiBF$_4$), lithium bis(oxalato) borate (LiBOB), lithium oxalyldifluoroborate (LiODFB), lithium sulfonylbis(fluorosulfonyl)imide (LiSFSI), lithium carbonylbis(fluorosulfonyl)imide (LiCFSI), lithium perchlorate (LiClO$_4$), lithium tetrachloroaluminate (LiAlCl$_4$), lithium iodide (LiI), lithium bromide (LiBr), lithium thiocyanate (LiSCN), lithium tetraphenylborate (LiB(C$_6$H$_5$)$_4$), lithium hexafluoroarsenate (LiAsF$_6$), lithium trifluoromethanesulfonate (LiCF$_3$SO$_3$), lithium bis(trifluoromethanesulfonimide) (LiN(CF$_3$SO$_2$)$_2$), or combinations thereof.

6. An electrochemical cell comprising the electrolyte composition according to claim 1.

7. An electrolyte composition consisting of:
a solvent comprising propylene carbonate (PC), wherein the propylene carbonate is included in the electrolyte composition at a concentration of greater than or equal to about 5 wt. % to less than or equal to about 70 wt. %;

a lithium salt dissolved in the solvent; and
a plurality of additives dissolved in the solvent,
wherein the plurality of additives consists essentially of vinylene carbonate (VC), lithium difluorophosphate (LFO), and prop-1-ene-1,3-sultone (PES).

8. The electrolyte composition according to claim 7, comprising:
the lithium salt at a concentration of greater than or equal to about 0.25 M to less than or equal to about 2 M, the lithium salt comprising lithium hexafluorophosphate (LiPF$_6$); and
the vinylene carbonate (VC), the lithium difluorophosphate (LFO), and the prop-1-ene-1,3-sultone (PES) each at an individual concentration of greater than or equal to about 0.05 wt. % to less than or equal to about 5 wt. %.

9. The electrolyte composition according to claim 7, wherein the solvent further comprises ethylene carbonate (EC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, 1,2-dimethoxyethane, 1-2-diethoxyethane, ethoxymethoxyethane, ethyl propyl ether (EPE), fluorinated linear carbonate (F-EMC), fluorinated ether (F-EPE), tetrahydrofuran (THF), 2-methyltetrahydrofuran (2-Me THF), or combinations thereof, and the lithium salt comprises lithium hexafluorophosphate (LiPF$_6$), lithium bis(fluorosulfonyl)imide (LiFSi), lithium bis(trifluoromethanesulfonyl)imide (LiTFSI), lithium tetrafluoroborate (LiBF$_4$), lithium bis(oxalato) borate (LiBOB), lithium oxalyldifluoroborate (LiODFB), lithium sulfonylbis(fluorosulfonyl)imide (LiSFSI), lithium carbonylbis(fluorosulfonyl)imide (LiCFSI), lithium perchlorate (LiClO$_4$), lithium tetrachloroaluminate (LiAlCl$_4$), lithium iodide (LiI), lithium bromide (LiBr), lithium thiocyanate (LiSCN), lithium tetraphenylborate (LiB(C$_6$H$_5$)$_4$), lithium hexafluoroarsenate (LiAsF$_6$), lithium trifluoromethanesulfonate (LiCF$_3$SO$_3$), lithium bis(trifluoromethanesulfonimide) (LiN(CF$_3$SO$_2$)$_2$), or combinations thereof.

10. An electrochemical cell comprising:
a separator disposed between an anode and a cathode; and
an electrolyte disposed in the separator and bridging the anode and the cathode,
wherein the electrolyte consists of:
a solvent comprising propylene carbonate (PC), wherein the propylene carbonate is included in the electrolyte at a concentration of greater than or equal to about 5 wt. % to less than or equal to about 70 wt. %;
a lithium salt dissolved in the solvent; and
a plurality of additives dissolved in the solvent,
wherein the plurality of additives consists essentially of vinylene carbonate (VC), lithium difluorophosphate (LFO), and prop-1-ene-1,3-sultone (PES).

11. The electrochemical cell according to claim 10, wherein the solvent of the electrolyte further comprises ethylene carbonate (EC), ethyl methyl carbonate (EMC), dimethyl carbonate (DMC), diethyl carbonate (DEC), or combinations thereof.

12. The electrochemical cell according to claim 10, wherein the lithium salt comprises lithium hexafluorophosphate (LiPF$_6$).

13. The electrochemical cell according to claim 10, wherein the anode comprises graphite, and wherein the graphite is substantially free of exfoliation after 800 cycles of charging and discharging.

14. The electrochemical cell according to claim 10, wherein the electrochemical cell exhibits a capacity retention of greater than or equal to about 95% after 800 cycles of charging and discharging.

15. The electrochemical cell according to claim 10, wherein the electrochemical cell exhibits a capacity retention of greater than or equal to about 98% after 800 cycles of charging and discharging.

16. The electrolyte composition according to claim 1, wherein the lithium salt comprises lithium hexafluorophosphate (LiPF$_6$).

* * * * *